(12) United States Patent
Murthy

(10) Patent No.: US 9,817,409 B2
(45) Date of Patent: Nov. 14, 2017

(54) METHOD AND APPARATUS FOR DISTRIBUTED CONTROL OF THERMOSTATIC ELECTRIC LOADS USING HIGH-GRANULARITY ENERGY USAGE DATA

(71) Applicant: NISHIHARA ENERGY, INC., Chiba (JP)

(72) Inventor: Nathan Murthy, Missouri City, TX (US)

(73) Assignee: Nishihara Energy, Inc., Chiba (JP)

( * ) Notice: Subject to any disclaimer, the term of this patent is extended or adjusted under 35 U.S.C. 154(b) by 599 days.

(21) Appl. No.: 14/287,856

(22) Filed: May 27, 2014

(65) Prior Publication Data
US 2015/0346741 A1 Dec. 3, 2015

(51) Int. Cl.
*G05D 23/19* (2006.01)
*G05B 15/02* (2006.01)
(Continued)

(52) U.S. Cl.
CPC ......... *G05D 23/1917* (2013.01); *G05B 15/02* (2013.01); *G05D 23/1934* (2013.01); *G05F 1/66* (2013.01); *H02J 3/14* (2013.01); *G05B 2219/2642* (2013.01); *H02J 2003/003* (2013.01); *Y02B 70/3225* (2013.01); *Y02B 70/3241* (2013.01); *Y02B 70/3275* (2013.01); *Y04S 10/54* (2013.01); *Y04S 20/222* (2013.01); *Y04S 20/227* (2013.01); *Y04S 20/244* (2013.01)

(58) Field of Classification Search
CPC .......... G05D 23/1917; G05D 23/1934; G05B 15/02; G05B 2219/2642; G05F 1/66; H02J 3/00
See application file for complete search history.

(56) References Cited

U.S. PATENT DOCUMENTS

| 6,783,080 B2 | 8/2004 | Antoniou et al. | |
| 2009/0012655 A1* | 1/2009 | Kienman | A61M 1/28 700/300 |

(Continued)

FOREIGN PATENT DOCUMENTS

| EP | 2535685 A1 * | 12/2012 | ............ G01D 4/002 |
| WO | WO-2013043863 A1 | 3/2013 | |
| WO | WO 2014172374 A1 * | 10/2014 | ......... G05D 23/1902 |

OTHER PUBLICATIONS

PCT Search Report and Written Opinion, PCT/US2014/039588, 10 Pages, dated Jan. 23, 2015.

*Primary Examiner* — Sean Shechtman
*Assistant Examiner* — Tri T Nguyen
(74) *Attorney, Agent, or Firm* — Moser Taboada

(57) ABSTRACT

A system, apparatus, and method for distributed control of thermostatic electric loads (TELs) including receiving at an energy gateway, a demand response event signal and receiving real-time measurements of a temperature value and a power consumption value corresponding to a temperature setting of a plurality of TELs. The method retrieving historical data from pre-determined load profiles for the TELs and comparing load profiles and real-time measurements to determine a first consumption trajectory. Further, coordinating temperature settings of at least two TELs to generate a second consumption trajectory corresponding to the demand response event signal.

18 Claims, 6 Drawing Sheets

(51) Int. Cl.
*G05F 1/66* (2006.01)
*H02J 3/14* (2006.01)
*H02J 3/00* (2006.01)

(56) References Cited

U.S. PATENT DOCUMENTS

| | | |
|---|---|---|
| 2009/0307573 A1 | 12/2009 | Lavelle et al. |
| 2011/0046806 A1* | 2/2011 | Nagel .................... H04L 67/125 700/291 |
| 2013/0289967 A1 | 10/2013 | Ludwig |
| 2014/0129197 A1 | 5/2014 | Sons et al. |
| 2014/0249876 A1* | 9/2014 | Wu ........................ G05B 15/02 705/7.12 |

* cited by examiner

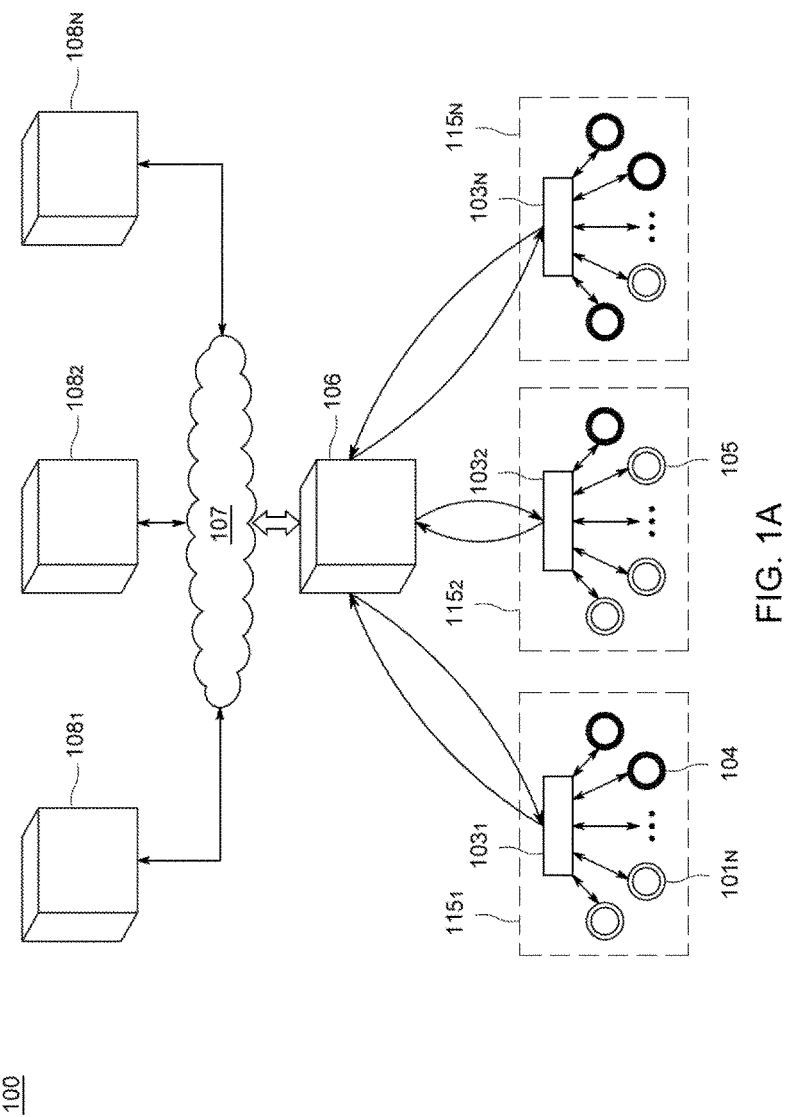

METHOD AND APPARATUS FOR DISTRIBUTED CONTROL OF THERMOSTATIC ELECTRIC LOADS USING HIGH-GRANULARITY ENERGY USAGE DATA

BACKGROUND OF THE INVENTION

Field

Embodiments of the present disclosure relate generally to control of power consumption, and, in particular, to distributed control of thermostatic loads.

Description of the Related Art

Remotely controlling thermostatic electric loads (TELs) such as heating, ventilation, and air conditioning (HVAC) units in homes and businesses during peak consumption hours has become a common practice of many electric power utilities. The control allows for issuing a demand response event signal that dynamically adjusts HVAC loads to conserve power and prevent overloading a power grid and ensure power distribution stability for the electric power utilities and consumers.

One method of direct TEL control has been to remotely adjust the temperature set points of the loads to reduce energy consumption. Typically this method is implemented by installing an AM or FM receiver with a relay on a heating unit or a cooling unit. A signal for a demand response event is then broadcast over the AM/FM network and induces the receiver-relay to disconnect the load from the power grid. For example, the heating unit of a building during winter is controlled to allow a measured temperature to drift lower a few degrees. Similarly, for a cooling unit during summer, the temperature is allowed to drift upward a few degrees. The method may also rely on Internet-based communication standards instead of AM/FM broadcast infrastructure. However, TEL control based solely on temperature does not provide compensation for individual loads, and merely lowers the amount of demanded power. The result is a lowered power demand, but the method is inefficient since without specific temperature compensation correlated to power usage monitoring, there are unbalanced loading cycles.

Therefore, there is a need in the art for a system, method, and apparatus that provides efficient control of thermostatic electric loads based on electric consumption for specific temperatures during demand response.

SUMMARY OF THE INVENTION

Embodiments of the present invention generally relate to a system, method, and apparatus for controlling thermostatic electric loads (TELs) using load profiles for load control during demand response as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is a diagram of an exemplary system for generating load profiles and demand response control in accordance with an embodiment of the present invention;

DETAILED DESCRIPTION

Figure 1B:
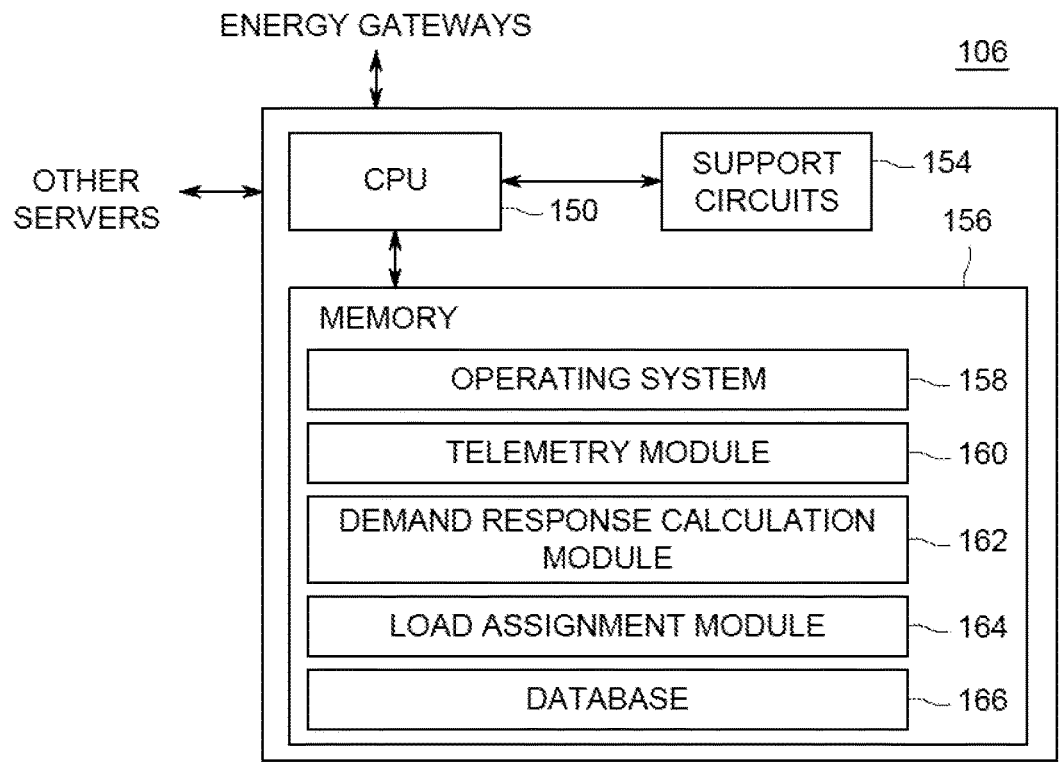
FIG. 1B is a block diagram of an exemplary demand response server of the system in FIG. 1A in accordance with an embodiment of the present invention.

Metering infrastructure enables utilities to collect power and energy measurements in repeated intervals (e.g., sub-minute intervals). This level of resolution into a utility's customer energy usage patterns allows a new class of demand response products, services, and software. Monitoring using the repeated intervals allows for the generation of load profiles based on historic data and preferences for buildings. The load profiles correlate power consumption and desired thermostat temperature for each room, building, or groups of buildings, depending on the desired granularity. The correlation is subsequently used to establish a demand response with complimentary matching profiles so as to yield compensation that (from the perspective of the grid) has a balanced load trajectory during demand response events. With a balanced load trajectory, buildings may be operated over a wider range of temperatures or be allowed to operate closer to a desired temperature for a longer duration while conserving energy as required by the utility.

FIG. 1A is a diagram of an exemplary system 100 for generating load profiles and demand response control in accordance with an embodiment of the present invention. The system 100 includes a communications infrastructure in preparation for, and during a demand response (DR) event. The system 100 comprises multiple thermostatic electric loads (TELs) $101_N$, energy gateways $103_N$, an automated DR server 106, and a network 107 enabling the DR server 106 to communicate with other servers $108_N$. The network 107 may be wired, wireless, a local area network (LAN), a wide area network (WAN), the Internet, or a combination thereof.

TELs $101_N$ include HVAC systems, heaters, air conditioners, refrigerators, chillers, and the like. TELs $101_N$ can either be in an ON state 104 or an OFF state 105. There may be several TELs $101_N$ on a single premise (e.g., local area $115_1$) or, alternatively, tied to a single customer account. In the OFF state, a thermostatic load is not drawing any power. The ON state 104 is composed of an initial transient "cold-load" pick-up, or surge in power consumption, followed by a steady-state power consumption level as the system (e.g., TEL $101_1$) settles before TEL $101_1$ is turned OFF 105 again.

Energy gateways $103_N$ collect real-time sensor data from TELs $101_N$ (e.g., temperature, other weather, date, time, power consumed, consumption duration, and the like) and dispatch local control actions from the DR server 106 on the TELs $101_N$, such that each energy gateway $103_N$ corresponds to a local area $115_N$. Each local area $115_N$, may correspond to a room, building, series of buildings, city, and the like for various load granularities. In other embodiments, the energy gateways $103_N$ can also communicate with non-thermostatic loads.

Communication signals between TELs $101_N$ and DR server 106 with the energy gateways $103_N$ are passed over wireless protocols such as IEEE 802.11 or 802.15 (ZIGBEE or SMART ENERGY PROFILE) or may be passed over other protocols such as ECHONET, BACNET, or MODBUS. In some embodiments, multiple energy gateways $103_N$ are communicatively coupled as a single resource under the management of the DR server 106 that may communicate over non-proprietary Internet-based protocols such as those outlined under OPENADR. In some embodiments, the energy gateways $103_N$ are logical or virtual entities that operate as a software module either on a virtual machine, base operating system, and existing energy management system, set-top box, or other hardware devices. An analytics engine runs on the gateway for local-area control, or on the server for wide-area control. In other embodiments, energy gateways $103_N$ may include specifically designed software and ASICs.

Energy gateways $103_N$ generate load profiles for each of the TELs $101_N$ as well as correlate the load profiles to a specific demand response received from the DR server 106. Load profiles are generated using historic data over a monitoring period (e.g., one month) that develop a heuristic approach in profile generation. Historic monitoring associates date, time, weather conditions, user preferences and the like to develop load profiles that provide accurate correlations as to what a set TEL $101_N$ temperature is required and how much power is consumed to maintain the temperature. In addition, load profiles may be operated in the aggregate by the energy gateways $103_N$ to yield a balanced load profile. The balanced load profile reduces strain on the grid, and maximizes the power supplied during generation utilities.

DR server 106 securely interfaces with systems that define the load dispatch, billing, aggregation parameters of each of the energy gateways and with supply-side resources for issuing control signals to improve the reliability or economic efficiency of the grid. The DR server 106 may interface with other servers $108_N$ over the network 107. In some embodiments, other servers $108_N$ include a price server and an energy trading platform for retail or wholesale electricity markets. In other embodiments, the other servers $108_N$ allow the DR server 106 to interface with a load aggregation platform within or across service territories (or load aggregation points in the case of deregulated markets). Alternatively, the other servers $108_N$ may also be billing and account servers of the electricity providers serving the customers who own energy gateways that may interface with the DR server 106. Thus, the DR server 106 securely interfaces with systems that define the load dispatch, billing, and aggregation parameters of each of the energy gateways $103_N$ and with supply-side resources for issuing control signals to TELs $101_N$ to improve the reliability or economic efficiency of a power grid.

FIG. 1B is a block diagram of an exemplary demand response server 106 of the system in FIG. 1A in accordance with an embodiment of the present invention. The DR server 106 comprises a central processing unit (CPU) 150, support circuits 154, and memory 156. The CPU 150 may be any commercially available processor, microprocessor, microcontroller, and the like. In other embodiments, the CPU 150 is a microcontroller such as a PIC. The support circuits 154 comprise well known circuits that provide functionality to the CPU 150 such as clock circuits, communications, cache, power supplies, I/O circuits, and the like.

The memory 156 may be any form of digital storage used for storing data and executable software. Such memory includes, but is not limited to, random access memory, read only memory, disk storage, optical storage, and the like. The memory 156 stores computer readable instructions corresponding to: demand response calculation module 162, and load assignment module 164. Additional embodiments may include a telemetry module 160, an operating system 158 and one or more databases 166 stored in memory 156.

In some embodiments, the telemetry module 160 on the DR server 106 receives sensor data for storage from energy gateways $103_N$. As will be further discussed below, alternative embodiments include generation of load profiles on the energy gateways $103_N$. The telemetry module 160 includes instructions to process data from TELs (e.g., TELs $101_N$). Sensor data may include indoor and outdoor ambient temperatures of a building and/or room, the thermostat temperature setting, and the amount of power consumed when a TEL $101_1$ is in an ON state 104 for a pre-determined period (e.g., less than a minute). The power consumption data is sampled at the steady-state power consumption level. Additional embodiments may include sampling of the initial transient "cold-load" power surge when first turning on a TEL 101.

The telemetry module 160 may also aggregate global public background information such as date, time, weather, and the like to correlate with the power consumption level and thermostat temperature. Public background information may be retrieved through the Internet. Other embodiments include generating load profiles for monitoring and recording energy consumption for operation between specific temperature ranges.

In some embodiments, the telemetry module 160 includes adjusting measurements with respect to specific user preferences. For example, a user that is a grocery store may specify, despite a demand response calling for all thermostats on a summer day to raise to 80 degrees Fahrenheit the grocery store may have a fixed maximum of 75 degrees Fahrenheit to impede mold growth. In another example, a gym sharing a building with an office may specify to over compensate to 83 degrees Fahrenheit so as to allow the adjoining office to remain at a more comfortable 77 degrees Fahrenheit. Generated load profiles based on thermostat temperature settings, actual measured temperatures, and aforementioned background data are stored in database 166.

In other embodiments, the telemetry module 160 receives actual temperature sensor data directly from temperature sensors placed in the vicinity of a TEL $101_1$ vent. In such an embodiment, the telemetry module 160 determines how effective cycling a thermostat between a given temperature range is to reach a desired temperature. The telemetry module 160 also includes background data such as weather (e.g., cooler days may only require fan operation) or day of the week (e.g., weekends at stores may have greater foot traffic and constant air conditioning to a set temperature).

The demand response calculation module 162 includes instructions for processing a demand response event and calculating a corresponding response with load trajectory. The demand response calculation module 162 is communicatively coupled to the telemetry module 160 and load assignment module 164. The demand response calculation module 162 retrieves load profiles stored in the database 166. In other embodiments, the demand response calculation module 162 requests the load profile of a TEL 101 to be instantaneously read. Subsequently, the demand response calculation module 162 determines the optimal temperature setting for TELs 101$_N$ to achieve a target power demand as received from the DR server 106. The demand response calculation module 162 then instructs the energy gateways 103$_N$ to adjust specific TELs 101$_N$ to a respective specific temperatures. For example, if a request is received to reduce loads to 1.00 kilowatt (kW) in a certain region or building, the demand response calculation module 162 may control one building to cycle around 74 degrees Fahrenheit and another building to 79 degrees Fahrenheit. The aggregate of the two specifically controlled buildings results in an overall balanced load reduction that would otherwise require other neighboring buildings also to raise temperatures to compensate for a demand response event.

In other embodiments, the demand response calculation module 162 may include receiving real-time energy consumption data and indoor temperature data in addition to historical data. The real-time data is applied to adjust in the system 100, specific TELs 101$_N$ to model a response to meet the demand requirements received from the other servers 108$_N$ or utility provider.

The load assignment module 164 includes instructions for communicating with the energy gateways 103$_N$. Alternatively, the load assignment module 164 includes instructions for communicating with the TELs 101$_N$. The load assignment module 164 converts desired operating temperature signals from the demand response calculation module 162 into the requisite communication signals necessary to control a specific TEL 101$_1$. For example, the energy gateway 103$_1$ may be coupled to one TEL 101$_1$ configured to receive commands wirelessly through IEEE 802.11(g) as well as another TEL 101$_2$ configured to receive commands through a wired LAN connection or power line communication (PLC).

The load assignment module 164 also coordinates with the demand response calculation module 162 to determine which TELs 101$_N$ are to be adjusted to meet the calculated necessary load trajectory based on pre-determined profiles. For example, the load assignment module 164 may determine two buildings in one city are able to cycle at a much higher temperature because a load profile determined the TELs 101$_N$ of the two have more efficient chillers and fan capabilities than surrounding buildings. As a result, the two buildings can cycle near a higher temperature to reduce overall grid power demand such that multiple surrounding buildings may operate closer to a desired lower temperature.

Figure 2:
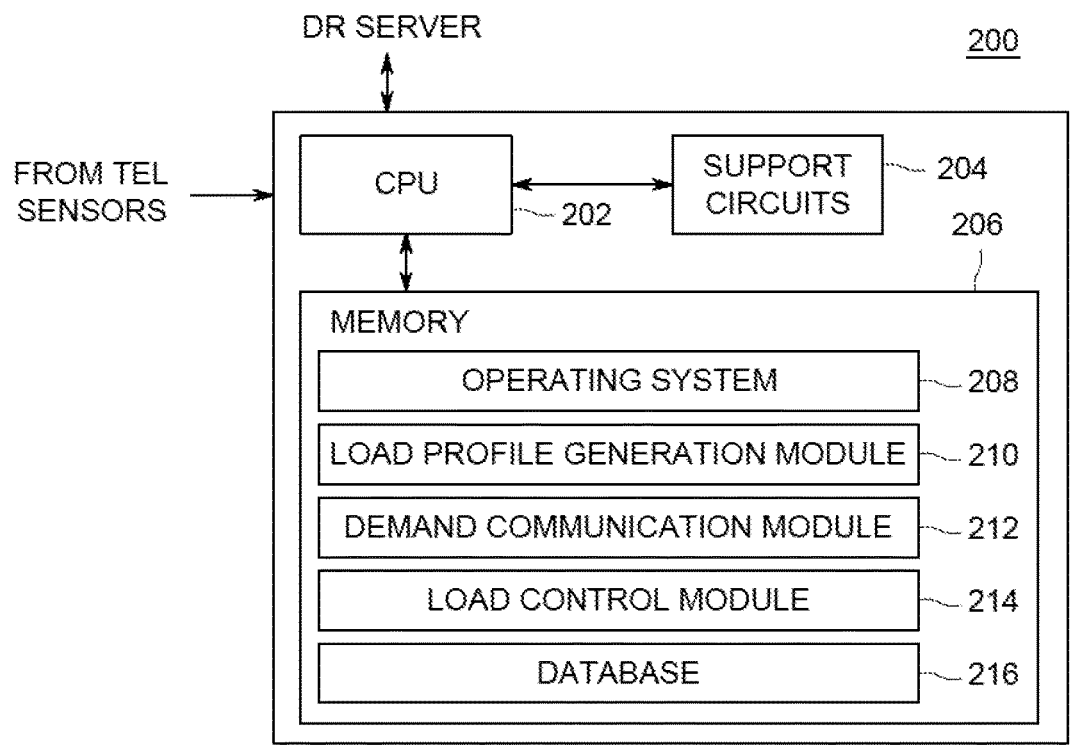
FIG. 2 is block diagram of an exemplary controller in an energy gateway operating the load profile generation and demand response control system depicted in FIG. 1 in accordance with an embodiment of the present invention.

FIG. 2 is block diagram of an exemplary controller 200 in an energy gateway 103$_N$ operating the load profile generation and demand response control system depicted above in FIG. 1 in accordance with an embodiment of the present invention.

The controller 200 comprises a central processing unit (CPU) 202, support circuits 204, and memory 206. The CPU 202 may be any commercially available processor, microprocessor, microcontroller, and the like. In other embodiments, the CPU 202 is a microcontroller such as a PIC. The support circuits 204 comprise well known circuits that provide functionality to the CPU 202 such as clock circuits, communications, cache, power supplies, I/O circuits, and the like.

The memory 206 may be any form of digital storage used for storing data and executable software. Such memory includes, but is not limited to, random access memory, read only memory, disk storage, optical storage, and the like. The memory 206 stores computer readable instructions corresponding to: a load profile generation module 210, demand communication module 212, and load control module 214. Additional embodiments may include an operating system 208 and one or more databases 216 stored in memory 206.

The load profile generation module 210 includes instructions to process data from TELs (e.g., TELs 101$_N$). Sensor data may include indoor and outdoor ambient temperatures of a building and/or room, the thermostat temperature setting, and the amount of power consumed when a TEL 101$_1$ is in an ON state 104 for a pre-determined period (e.g., less than a minute). The power consumption data is sampled at the stead-state power consumption level. Additional embodiments may include sampling of the initial transient "cold-load" power surge when first turning on a TEL 101. The load profile generation module 210 may also aggregate global public background information such as date, time, weather, and the like to correlate with the power consumption level and thermostat temperature. Other embodiments include generating load profiles for monitoring and recording energy consumption for operation between specific temperature ranges.

In some embodiments, the load profile generation module 210 includes specific user preferences. For example, a user that is a grocery store may specify, despite a demand response calling for all thermostats on a summer day to raise to 80 degrees Fahrenheit the grocery store may have a fixed maximum of 75 degrees Fahrenheit to impede mold growth. In another example, a gym sharing a building with an office may specify to over compensate to 83 degrees Fahrenheit so as to allow the adjoining office to remain at a more comfortable 77 degrees Fahrenheit. Generated load profiles based on thermostat temperature setting, actual measured temperature, and aforementioned background data are stored in database 216.

In other embodiments, energy gateways 103$_N$ may upload load profiles and system measurements to the DR server 106 to conserve memory resources. Alternatively, the load profiles and system measurements may be uploaded to a telemetry module on the DR server 106. In such an embodiment, the telemetry module 160, organizes the measurements for coordination of a load trajectory communicated to the communication module 212.

In other embodiments, the load profile generation module 210 receives actual temperature sensor data from temperature sensors placed in the vicinity of a TEL 101$_1$ vent. In such an embodiment, the load profile generation module 210 determines how effective cycling a thermostat between a given temperature range is to reach a desired temperature. The load profile generation module 210 also includes background data such as weather (e.g., cooler days may only require fan operation) or day of the week (e.g., weekends at stores may have greater foot traffic and constant air conditioning to a set temperature).

The demand communication module 212 processes communication exchanges with the DR server 106. The demand communication module 212 sends measurement data to the DR server 106 and processes commands for a load profile to respective TELs 101$_N$. The demand communication module is configured to receive communications through wireless, cellular, wired LAN network connections or power line communication (PLC) from the DR server 106. In some embodiments, the communications with the DR server 106 are done through secure communication protocols or may require authentication into the DR server 106.

In other embodiments, the demand communication module 212 may include receiving real-time energy consumption data and indoor temperature data in addition to historical data. The real-time data is applied to adjust in the system 100, specific TELs $101_N$ to model a response to meet the demand requirements received from the DR server 106.

The load control module 214 includes instructions for communicating with the TELs $101_N$. The load control module 214 converts desired operating temperature signals from the DR server 106 for a calculated load trajectory into the requisite communication signal necessary to control a specific TEL $101_1$. For example, the energy gateway $103_1$ may be coupled to one TEL $101_1$ configured to receive commands wirelessly through IEEE 802.11(g) as well as another TEL $101_2$ configured to receive commands through a wired LAN connection or power line communication (PLC).

Figure 3:
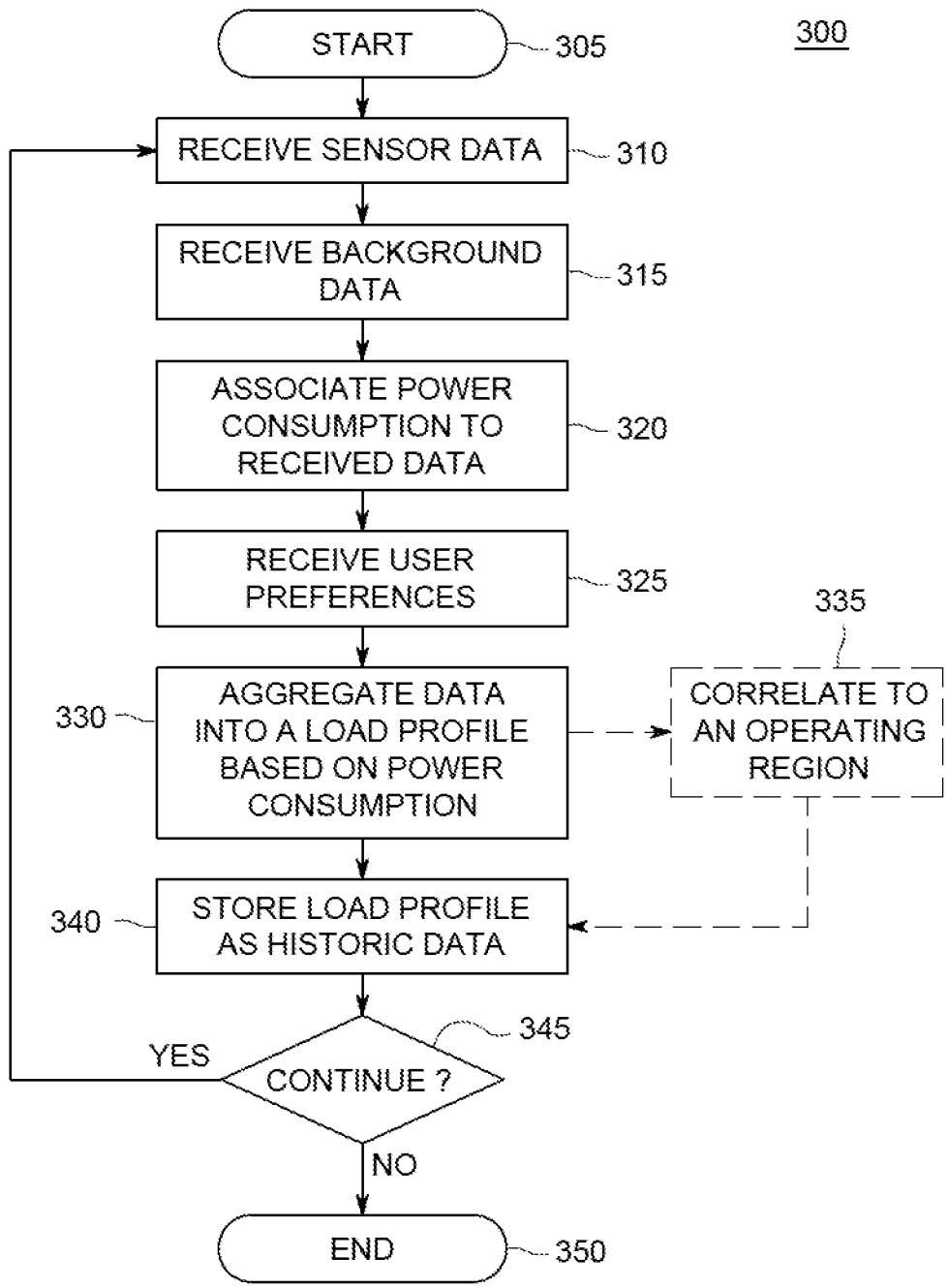
FIG. 3 is a flow diagram of an exemplary method for building load profiles in accordance with an embodiment of the present invention.

FIG. 3 is a flow diagram of an exemplary method 300 for building load profiles in accordance with an embodiment of the present invention. The method 400 is implemented by the DR server 106 and energy gateways $103_N$ and system 100 described above. Load profiles are initially built during an observational period spanning months prior to deployment in a demand response event. In addition, established load profiles may be continually updated over time.

The method 300 begins at step 305 and continues to step 310. At step 310, temperature and power consumption data from sensors is received. Temperature data sampled includes the thermostat setting, indoor ambient temperature, and outdoor temperature. Power consumption data includes kW, kilowatt hour (kWh), instantaneous current, instantaneous voltage, and the like. The sampling rate of sensor data has a higher frequency than the duty-cycle of an exemplary TEL $101_N$. For example, a rooftop AC unit cycles on/off every 15 minutes to maintain a constant indoor temperature. In such an example, to properly measure power and temperature data, sampling must be at a rate higher than once per 15 minutes such as once every 2, 4, 30 seconds or 5 minutes and the like.

Next, at step 315, background data is received. Background data includes public weather data, address, TEL unit information, time, date, geographic location, elevation and the like.

Next, at step 320 power consumption data is associated with the temperature data and other received data from step 315. For example, a 1200 watt TEL $101_1$ operating in a single-family unit during the heat of summer when the outdoor ambient temperature is 101 degrees may require 4 kWh to maintain a temperature at 68 degrees but 2 kWh to maintain a temperature of 70 degrees for a day. The same TEL $101_1$ may require 1 kWh to maintain a temperature at 70 degrees when the outdoor ambient temperature is 80 degrees for a day.

Then at step 325, the method 300 receives user preferences. User preferences may include specific temperature ranges that must be maintained throughout the day or for a time of day.

Next, at step 330, all data is aggregated into a load profile based on power consumption over an observation period. By aggregating data over time, the load profile includes load trajectories for specific TELs $101_N$ to maintain a specific temperature during the operating environment as determined from the background data. Similarly, certain data may be flagged in a load profile for anomalous events rare events such as natural disasters and given less importance in a profile.

Optionally, at step 335, load profiles may be correlated to an operating region. Load profiles for TELs $101_N$ may be correlated and grouped by location to allow faster allocation of resources or adjustments of loads within the grid. For example, user accounts or TELs $101_N$ with the same zip code may be correlated together for fine control during a demand response within a county.

At step 340, the load profiles are stored in memory as historical data for assigned TELs $101_N$. The method 300 proceeds to step 345 to determine whether to continue building and/or updating load profiles. If a determination is made to continue, the method 300 reverts to step 310. If however, a determination is made not to continue, the method 300 ends at step 350.

Figure 4:
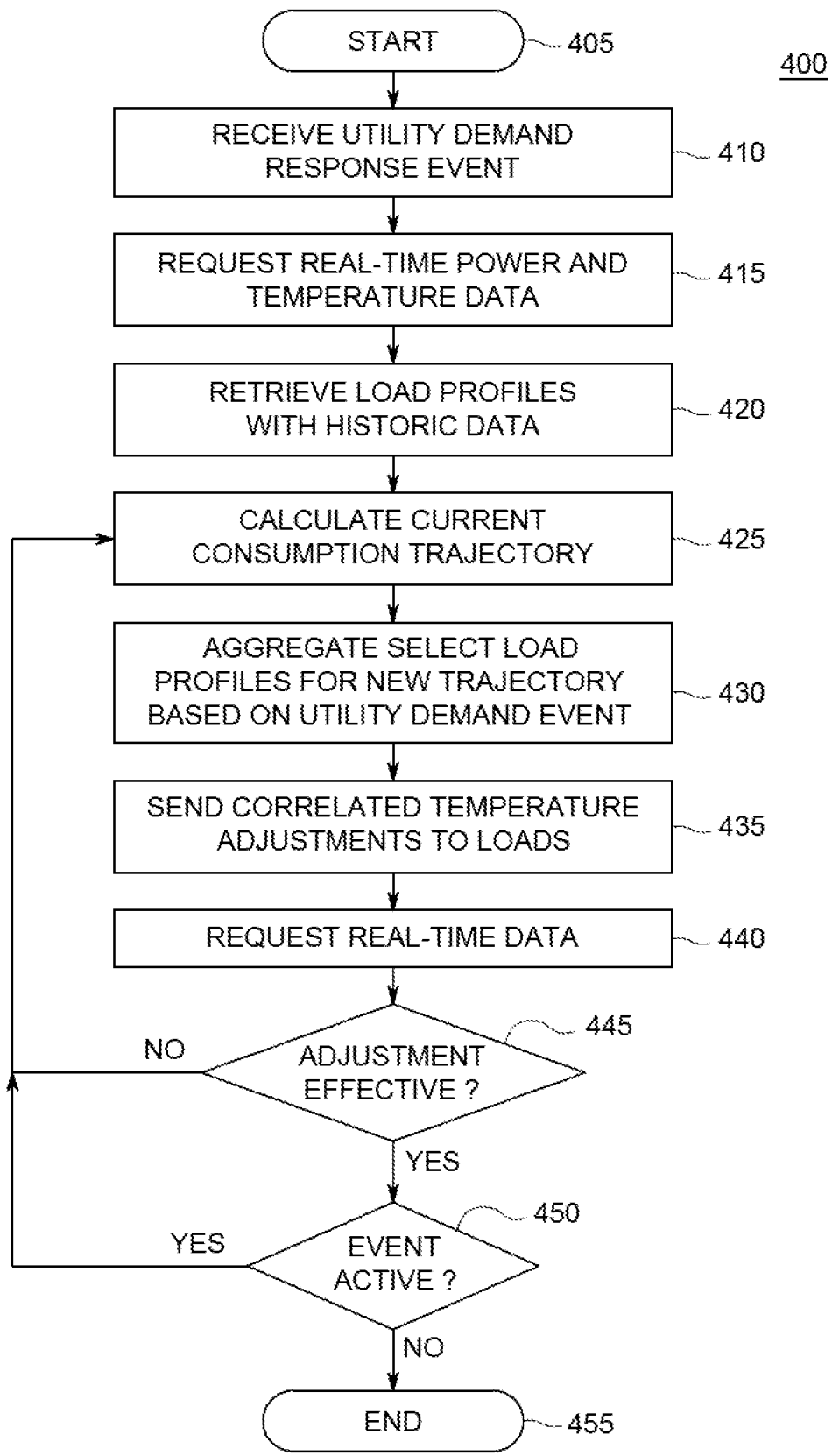
FIG. 4 is a flow diagram of an exemplary method for demand response using the load profiles in accordance with an embodiment of the present invention.

FIG. 4 is a flow diagram of an exemplary method 400 for demand response using the load profiles in accordance with an embodiment of the present invention. The method 400 is implemented by system 100, energy gateways $103_N$ and controllers described above.

The method 400 begins at step 405 and continues to step 410. At step 410, a demand response event is received from a utility or DR server 106. In some embodiments, a load trajectory is calculated to meet the requirements of the demand response event. Next, at step 415, a request for real-time power consumption and temperature data is made to the TELs $101_N$.

Next, at step 420, select load profiles with historical data is retrieved from the database 216 for respective TELs $101_N$. The selected load profiles are those corresponding to TELs $101_N$ of a region that is receiving the demand response event signal.

Then at step 425, the method 400 calculates the trajectory of the current power consumption by the TELs $101_N$. Calculations include comparing historical data in the load profiles to that of the requirements from the desired demand event. For example, historical data associates the amount of power consumed to operate in a specific temperature range. Thus, the amount of power drawn by a specific TEL $101_1$ may be predicted if operated at a specific temperature. The prediction is further defined based on background data in the load profile discussed above. In addition, as will be discussed in FIG. 5 below, calculations also include summing multiple load profile waveforms corresponding to power usage.

In some embodiments, parameters for determining load trajectory are calculated based on thermal capacitance and resistance of specific TELs $101_N$. Thermal characteristics of each TEL $101_N$ may be determined by Equation 1:

$$a = e^{-h/(CR)} \quad (1)$$

In the above Equation 1, parameter "a" represents the thermal characteristic of a TEL 101. Parameters "C" and "R" are respectively the thermal capacitance and resistance of the TEL $101_N$ and "h" is a time step.

The transition or evolution of the indoor temperature in the next time step is a function of current indoor temperature, ambient outdoor temperature, and temperature gain provided in Equations 2 and 3:

$$T_{indoor,t+1} = aT_{indoor,t} + (1-a)(T_{outdoor} - uT_{gain}) + \epsilon \quad (2)$$

$$T_{gain} = RP_{rate} \quad (3)$$

In Equations 2 and 3, $T_{gain}$ is always a non-negative number, and E is random temperature noise. The parameter "u" is either 0 or 1 that is representative of either an OFF state or ON state of the TEL $101_N$. If $T_{gain}$ is positive then the TEL $101_N$ is operating as a cooling unit and therefore driving the indoor temperature down when it is in the ON state (i.e. u=1). Similarly, $T_{gain}$ is negative when the TEL is operating as a heating unit.

Since the system 100 does not know C, R, and ϵ a priori, these values must be "learned" over time (i.e., stored and calculated measurements accumulated over an observational time period). By collecting historic temperature and power data and performing semi-parametric regression on $T_{indoor}$, $T_{outdoor}$, and $P_{rate}$, the value of C, R, and ϵ may be estimated. Once sufficient data for a specified observational time period (e.g., days, weeks, months, seasons, years, and the like) has been collected and analyzed, a model for resolving a predictive control problem may be established for determining load trajectories and load profiles. In some embodiments, the values of the parameters may be adjusted as the values are subject to the uncertainty tolerance of the grid operator. The model for the predictive control is represented by $x_t$ in Equation 4:

In the aforementioned Equation 4, the value of parameter $x_t$ represents a vector temperature, and power states for all TELs $101_N$. A parameter $u_t$ is a vector value of control states composed on 0's (OFF state) and 1's (ON state). For example, x=[28 29 24 27] represents in Celsius, four TELs with the individual temperature states of 28° C., 29° C., 24° C., and 27° C. The estimated power states are a function of the of the "u" vector, (e.g., if u=[0 0 1 0] then all but one of four TELs is turned OFF).

The parameter "C" is a matrix derived from the temperature dynamics described in the above Equations 1-4. The parameter "B" is a matrix of representing the influence of the respective TEL control states in the system 100 (e.g., all TELs $101_N$ coupled to the DR server 106). The parameter $x_{t+1}$ represents the predicted states of each of the TELs $101_N$. In general, $u_t$ is aleatoric and substantially determined by the individual preferences of the TEL users (e.g., home owners, building tenants, and the like). However, when a DR event signal is dispatched from the DR server 106 to the energy gateways $103_N$ and TELs $101_N$, the values of "$u_t$" are selected as to control the sum of all values of $P_{rate}$ in Equation 3 for all TELs $101_N$ within the system 100. The selections of the "u" values are based on a desired aggregate power consumption level of the grid operator communicated to the DR server 106. The load trajectory is thus determined so as operative to establish the desired aggregate power consumption level provided by the grid operator or utility provider (e.g., other servers $108_N$).

At step 430, load profiles are selected and aggregated to be coordinated for new temperatures and power consumption that conform a new load trajectory that corresponds to the utility demand event received from the DR server 106. By adjusting thermostat temperature, and scheduling the timing of cycling between ON states 104 and OFF states 102, a new load trajectory is generated for TELs $101_N$. The cumulative profile results in a trajectory is a balanced load correlating to the desired demand event.

At step 435, the method sends the corresponding temperature adjustments to the TELs $101_N$ that are correlated to previous historical data energy consumption loads. For example, a previous load profile for a TEL $101_1$ may show a steady-state operation of 0.8 kW for a temperature of 78 degrees. Continuing the example, a previous load profile for a TEL $101_2$ may show a steady-state operation of 0.2 kW for a temperature of 75 degrees. The net operation of the TELs $101_1$ and $101_2$ would meet a new trajectory requirement of 1 kW.

Next at step 440, the method requests real-time power consumption and temperature data. This second sampling of data is used to determine the effectiveness of the newly implemented trajectory in step 445.

At step 445, the method 400 determines whether the temperature adjustments to the TELs $101_N$ was effective in meeting the demand response event requirement. In some embodiments, meeting the requirement may have a predetermined acceptable error tolerance (e.g., +/−2%). If it is determined the adjustment is insufficient, the method 400 reverts back to step 425. If however, the adjustment is sufficient, the method 400 continues to step 450.

At step 450, the method 400 determines whether the demand response event is still active. If determined to be still active, the method 400 reverts back to step 425. In most instances, the events are temporary measurements taken by power utilities to prevent blackouts. Once an event is signaled as over or the event signal is no longer received from the DR server 106, the method 400 determines the event is not active and the method 400 ends at step 455.

Figure 5A:
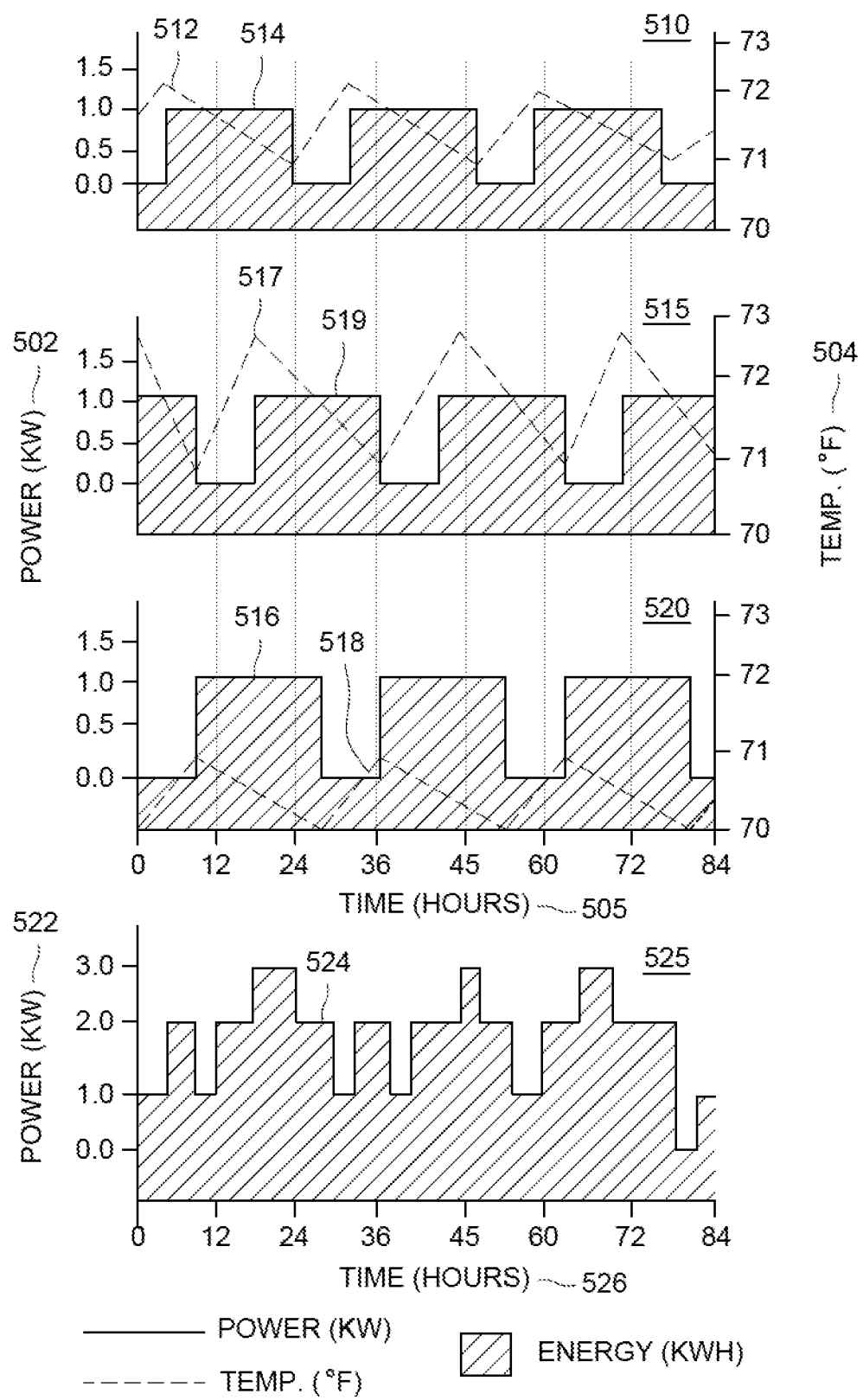
FIGS. 5A and 5B are a comparative series of exemplary graphs of depicting load balancing in accordance with an embodiment of the present invention.
Figure 5B:
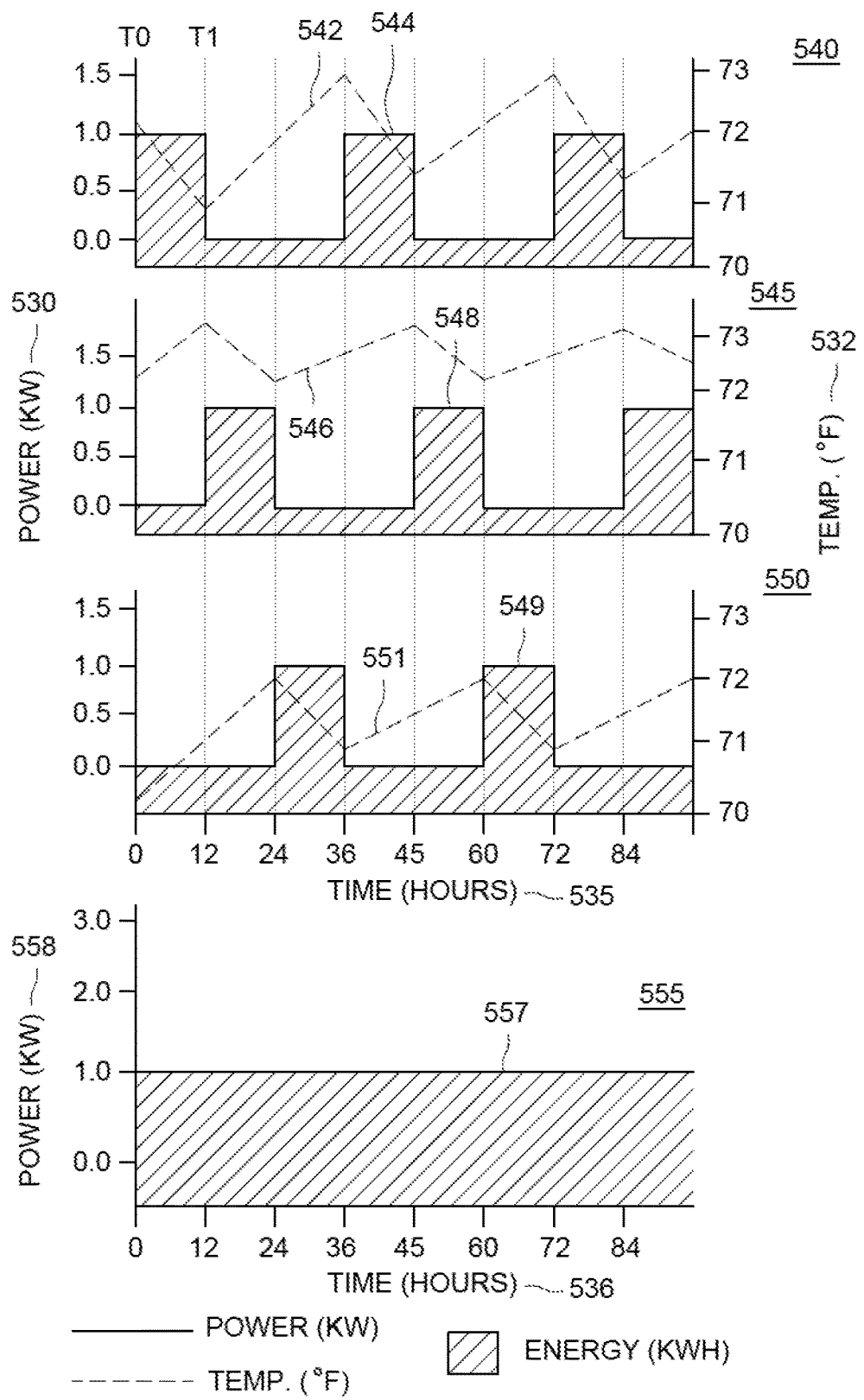

FIGS. 5A and 5B is a comparative series of exemplary graphs of depicting load balancing in accordance with an embodiment of the present invention. FIGS. 5A and 5B includes plots of measured temperature in degrees Fahrenheit, power in kW, and energy as kWh (depicted as the area under the power curve). FIG. 5A includes graphs 510, 515, 520, 525 representing TELs $101_N$ prior to temperature adjustments when there is no demand response event corresponding to exemplary load profiles. Graphs 510, 515, and 520 are plots of power 502 and temperature 504 over time 505. Graph 525 is a plot of power 522 over time 526.

Graphs 510, 515, and 520 correspond to exemplary TELs $101_N$. Graph 510 plots historical data for TEL $101_1$ with an indoor temperature waveform 512 separately measured from a temperature sensor, a corresponding recorded consumed power curve 514 is shown for operating an associated HVAC between 71 and 72 degrees. The temperature sensor is in addition to any standard thermostat sensors in the TELs $101_N$. Graph 515 plots historical data for TEL $101_2$ with an indoor temperature waveform 517 and corresponding recorded consumed power curve 519 for operating an associated HVAC between 71 and 73 degrees. Graph 520 plots historical data for TEL $101_N$ with a temperature waveform 518 and corresponding recorded consumed power curve 516 for operating an associated HVAC between 70 and 71 degrees. From the graph 520, TEL $101_N$ consumes much more power to maintain a temperature point range and is either a much larger or inefficient HVAC system than that of TEL $101_1$ and TEL $101_2$. Graph 525 is an aggregate of graphs 510, 515, and 520 that indicate a net consumption waveform 524 that has a generally haphazard inefficient trajectory.

FIG. 5B includes graphs 540, 545, 550, 555 representing TELs $101_N$ controlled during a demand response event. Graphs 540, 545, and 550 are plots of power 532 and temperature 532 over time 535. Graph 555 is a plot of power 558 over time 536.

Graph 540 plots real-time data for TEL $101_1$ with an indoor temperature 542 and corresponding measured consumed power curve 544. With the DR event active, a comparison of graph 540 to 510 indicates operating in a temperature range between 72 and 73 degrees consumes less energy (e.g., width of consumed power curve 544 from t0 to t1). In addition, the cycling of the associated HVAC system with TEL $101_1$ shifts the energy consumption as shown by a comparison of peaks of the consumed power curves 514 and 544.

Graph 545 plots real-time data for TEL $101_2$ with an indoor temperature waveform 546 and corresponding measured consumed power curve 548. Similarly to TEL $101_1$, during a DR event, the TEL $101_2$ is controlled to operate between 72 and 73 degrees. A comparison of graphs 545 and 515 show decreased energy consumption between curves 519 and 548.

Graph 550 comprises real-time data for TEL 101$_N$ with a temperature waveform 551 and corresponding measured consumed power curve 549. From the graph 520, TEL 101$_N$ consumes less power as compared to graph 520. Although TEL 101$_N$ is controlled to operate across a higher degree range (e.g., 70.5 degrees to 72 degrees), the ratio to temperature and energy consumed is smaller and thus TEL 101$_N$ is operated more efficiently.

Graph 555 is an aggregate of graphs 540, 545, and 550 that indicate a net consumed power curve 557 that is a stable load. The shifting of consumption peaks in curves 544, 548, and 549 as resultant from the active DR event compensation described above yields the consumed power curve 557 to be of a more stabilized load trajectory as compared to curve 524.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for distributed control of thermostatic electric loads (TELs) using load profiles performed by an energy gateway comprising:
   receiving at the energy gateway, a demand response event signal;
   receiving real-time measurements of a temperature value and a power consumption value corresponding to a temperature setting of a plurality of TELs;
   retrieving historical data from pre-determined load profiles for the TELs;
   comparing historical data with requirements of the demand response event signal and calculating a current power consumption trajectory predicting power consumption of the TELs when conforming to the demand response event signal based on the comparison, the calculating taking into consideration thermal characteristics of the TELs according to the formula: $a=e^{-h/(CR)}$, wherein h is a time step, C is a thermal capacitance of each TEL and R is a thermal resistance of each TEL, and C and R are learned over time by collecting historic consumption data and performing operations on current indoor temperature, ambient outdoor temperature and temperature gain;
   aggregating and selecting second load profiles to be coordinated for a new consumption trajectory based on the demand response event signal;
   coordinating temperature adjustments based on the current power consumption trajectory of at least two TELs such that total power consumption correlates to historical data in previous load profiles associated with the TELs;
   requesting and receiving real-time measurements of the temperature value and the power consumption value and continue to recalculate the current power consumption trajectory while the temperature adjustments are ineffective; and
   continue to recalculate the current power consumption trajectory while the demand response event signal is still active.

2. The method of claim 1, wherein historical data includes background data for the TELs.

3. The method of claim 2, wherein historical data includes at least one of weather, time, date, or geographic location.

4. The method of claim 1, wherein coordinating temperature adjustments further comprises adjusting temperature settings for TELs based on historic energy consumption.

5. The method of claim 4, further comprising scheduling when each TEL cycles to an ON state and a duration of a steady-state operation.

6. The method of claim 1, wherein load profiles are generated using received temperature sensor data over an observation period and aggregated according to a power consumption level.

7. The method of claim 6, wherein load profiles record background data and associate the background data to the temperature sensor data.

8. An energy gateway apparatus for distributed control of thermostatic electric loads comprising:
   a) at least one processor;
   b) at least one input device coupled to at least one network; and
   c) at least one storage device storing processor executable instructions comprising:
      (i) a load profile generation module operative to generate load profiles;
      (ii) demand response calculation module operative to:
         request real-time measurements of a temperature value and a power consumption value corresponding to a temperature setting of a plurality of TELs upon receiving a demand response event signal,
         retrieving historical data from load profiles for the TELs,
         comparing historical data with requirements of the demand response event signal and
         calculating a current power consumption trajectory predicting power consumption of the TELs when conforming to the demand response event signal based on the comparison, the calculating taking into consideration thermal characteristics of the TELs according to the formula: $a=e^{-h/(CR)}$, wherein h is a time step, C is a thermal capacitance of each TEL and R is a thermal resistance of each TEL, and C and R are learned over time by collecting historic consumption data and performing operations on current indoor temperature, ambient outdoor temperature and temperature gain,
         aggregating and selecting second load profiles to be coordinated for a new consumption trajectory based on the demand response event signal,
         coordinating temperature adjustments based on the current power consumption trajectory of at least two TELs such that total power consumption correlates to historical data in previous load profiles associated with the TELs,
         requesting and receiving real-time measurements of the temperature value and the power consumption value and
         continuing to recalculate the current power consumption trajectory while the temperature adjustments are ineffective and continue to recalculate the current power consumption trajectory while the demand response event signal is still active; and iii. a load control module for selectively controlling the plurality of TELs based on the calculated current power consumption trajectory.

9. The apparatus of claim 8, further comprising a database module storing historical data that includes background data for the TELs.

10. The apparatus of claim 9, wherein historical data includes at least one of weather, time, date, or geographic location.

11. The apparatus of claim 8, wherein the demand response calculation module further adjusts temperature settings for TELs based on historic energy consumption.

12. The apparatus of claim 11, further comprising storing processor executable commands to schedule when each TEL cycles to an ON state and a duration of a steady-state operation.

13. The apparatus of claim 8, wherein stored load profiles further record background data and associate the background data to temperature sensor data.

14. The apparatus of claim 8, further comprising wherein the demand response event signal is from a demand response server.

15. A system for distributed control of thermostatic electric loads (TELs) comprising:
a demand response server;
a plurality of TELs;
a plurality of energy gateways, each coupled to the plurality of TELs, such that each energy gateway comprises a controller with at least one processor and at least one storage device storing processor executable instructions which, when executed by the at least one processor, performs a method including:
receiving a demand response event signal from the demand response server;
receiving real-time measurements of a temperature value and a power consumption value corresponding to a temperature setting of a plurality of TELs;
retrieving historical data from pre-determined load profiles for the TELs;
comparing historical data with requirements of the demand response signal and calculating a current power consumption trajectory predicting power consumption of the TELs when conforming to the demand response event signal based on the comparison, the calculating taking into consideration thermal characteristics of the TELs according to the formula: $a = e^{-h/(CR)}$, wherein h is a time step, C is a thermal capacitance of each TEL and R is a thermal resistance of each TEL, and C and R are learned over time by collecting historic consumption data and performing operations on current indoor temperature, ambient outdoor temperature and temperature gain;
aggregating and selecting second load profiles to be coordinated for a new consumption trajectory based on the demand response event signal;
coordinating temperature adjustments based on the current power consumption trajectory of at least two TELs such that total power consumption correlates to historical data in previous load profiles associated with the TELs;
requesting and receiving real-time measurements of the temperature value and the power consumption value and continue to recalculate the current power consumption trajectory while the temperature adjustments are ineffective; and
continue to recalculate the current power consumption trajectory while the demand response event signal is still active.

16. The method of claim 1 further comprising establishing a model for resolving the current power consumption trajectory using the following formula:

$$x_{t+1} = CMx_t + Bu_t$$

wherein $x_t$ represents a vector temperature and power states for all TELs, $u_t$ is a vector value of control states of the TELs, CM is a matrix derived from the formula 1, B is a matrix of the influence of control states of all of the TELs, and $x_{t+1}$ is the predicted states of all the TELs.

17. The method of claim 16, wherein indoor temperature at a next time is determined according to the following formula:

$$T_{indoor,t+1} = aT_{indoor,t} + (1-a)(T_{outdoor} - uT_{gain}) + \epsilon,$$

wherein $T_{gain} = RP_{rate}$, $\epsilon$ is random temperature noise and learned over time, u is an OFF or ON state of a TEL, and $T_{gain}$ is the temperature gain.

18. The method of claim 17, wherein $u_t$ is initially determined by individual preference of users of the TELs, and determined by the energy gateway to control the sum of all values in $P_{rate}$ for all TELs when the demand response event signal is received.

* * * * *